(No Model.)
A. J. HOLT.
APPARATUS FOR IMMERSING GALVANIC BATTERY PLATES.
No. 253,165. Patented Jan. 31, 1882.
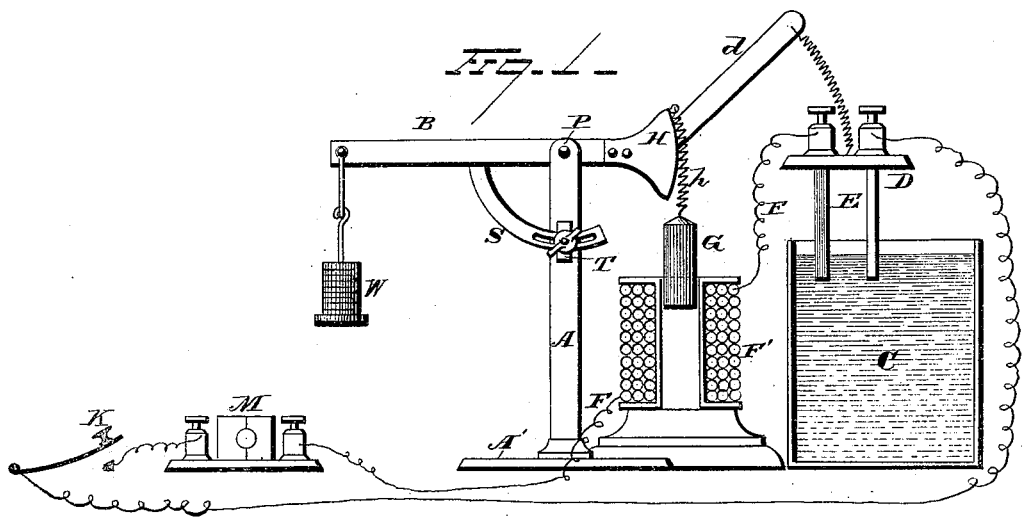
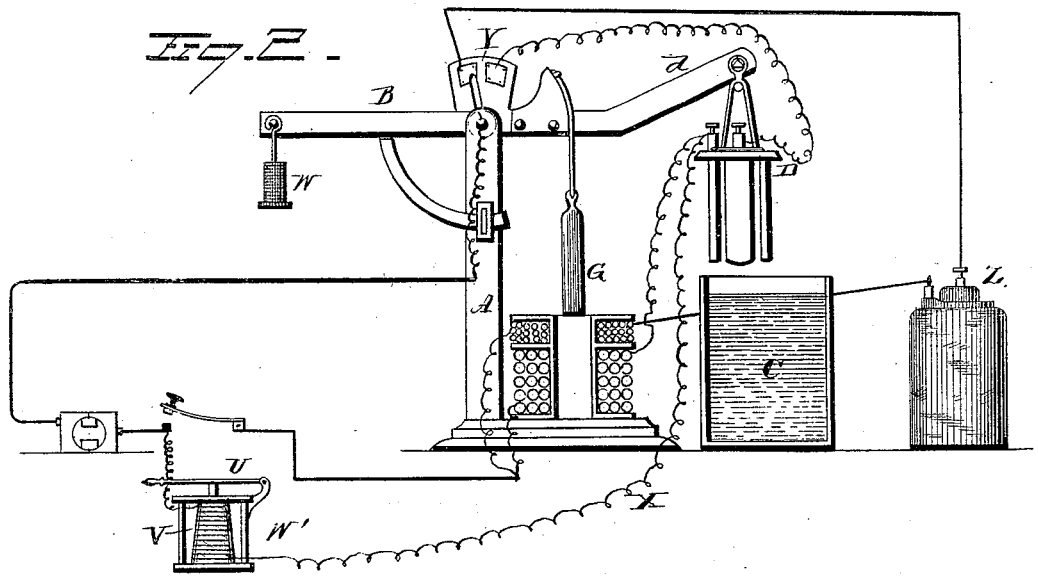
WITNESSES
INVENTOR
A. J. Holt,
By H. A. Symmom
ATTORNEY

UNITED STATES PATENT OFFICE.

ARTHUR J. HOLT, OF GRAND RAPIDS, MICHIGAN, ASSIGNOR OF TWO-THIRDS TO WILLIAM H. JONES AND JOHN J. SOURS, OF SAME PLACE.

APPARATUS FOR IMMERSING GALVANIC-BATTERY PLATES.

SPECIFICATION forming part of Letters Patent No. 253,165, dated January 31, 1882.

Application filed October 4, 1881. (No model.)

*To all whom it may concern:*

Be it known that I, ARTHUR J. HOLT, of Grand Rapids, in the county of Kent and State of Michigan, have invented certain new and useful Improvements in Apparatus for Immersing Galvanic-Battery Plates; and I do hereby declare the following to be a full, clear, and exact description of the invention, such as will enable others skilled in the art to which it pertains to make and use the same.

My invention relates to improvements in galvanic batteries.

It is well known that single-fluid galvanic batteries, when on continuous closed circuit, rapidly become polarized and lose their strength, which may be, however, restored by withdrawing the electrodes from the exciting-fluid for a moment and reimmersing them. In using such a battery, for instance, to furnish power for running a motor for a sewing-machine, or a fret-saw, or other intermittent work, it has been necessary heretofore to have the battery placed near the operator, so that he could in the intervals of the work remove the electrodes from the fluid and reimmerse them. If the sewing or other machine operated by the battery is required to be moved from its accustomed place to accommodate bulky work, to obtain a better light, or for any other purpose, it has been necessary to move the battery also, with the attendant danger of spilling the acid solution. It is furthermore dangerous to have the battery where children can possibly get at it.

The object of my invention is to provide a simple means whereby the electrodes may be immersed or withdrawn from the exciting-fluid by the action of the current itself, controlled by a simple circuit-breaker near the operator. The battery may then be placed in any convenient out of the way position, such as on a high shelf or in a cellar, and need not be moved. Any movement of the machine may be accommodated by using flexible conducting-cords.

My invention consists in a galvanic battery provided with electrodes adapted to be immersed in or withdrawn from the exciting-fluid by means of the current formed by the battery itself acting upon a core through the medium of a magnetic coil placed in the circuit of the battery, said circuit being controlled by a suitable circuit-breaker.

The invention also consists in providing a battery with means for compensating for the decreased weight of the electrodes when immersed, and in the details of construction hereinafter set forth.

In the drawings, Figure 1 represents a side elevation of my invention, the battery-cell and the magnetic coil being shown in vertical section. Fig. 2 illustrates my improved battery provided with modifications hereinafter described.

A represents a standard, mounted on a suitable base, A'. The standard supports a balance-beam, B, which is pivoted to the standard, as at P, and is free to oscillate in a perpendicular plane. At one end of the beam is suspended a series of weights, W, and at the opposite end is suspended a frame, D, to the under side of which are attached the electrodes E.

Directly below the frame D and the electrodes is placed the battery-cell C, containing the exciting-fluid. Only one cell is shown in the drawings; but of course several may be used, each having its electrodes connected to the frame D.

To one electrode is attached a conducting-wire, F, which is then formed into the coil F', which forms, when traversed by the current, an electromagnetic coil. The latter is placed upright in a suitable position for attracting and receiving a soft-iron core, G, attached to the upper end of a segment or arc, H, of the balance-beam B by a flexible connection, *h*. The arc H is attached rigidly to the beam B, and being in the form of a section of a circle whose center is at P, the core G will move perpendicularly when the beam is oscillated. The connecting-wire, after forming the coil F', proceeds to, say, the motor, as at M, and thence to the other electrode forming a galvanic circuit. At some point of the circuit, within convenient reach of the operator, is placed a key, K, for opening or closing the circuit.

A curved stop, S, attached to the standard A, and adjustable thereon by means of a thumb-screw, T, limits the downward motion of the weighted end of the beam B. The end $d$ of the beam to which the frame D is attached is turned upward at a greater or less angle, so that when that end of the beam descends the leverage will gradually increase, because the frame and the electrodes will be thrown farther from the point P as they descend. This increase of leverage will compensate for the decrease in weight of the electrodes, by reason of the fluid they displace.

The operation of the device is as follows: The weights W are adjusted so that their end of the beam slightly preponderates over the other end, and the electrodes are therefore normally raised. The stop S is adjusted so that the lower ends of the electrodes are slightly immersed in the fluid. Then, if the key K be closed, a current circulates in the coil F', the core G is attracted, and this pulls down the beam and immerses the electrodes still more, creating a stronger current, which makes the hollow electro-magnet F' stronger, until the core is drawn completely into the coil and the electrodes are fully immersed. The opening of the key breaks the current, when the coil F' being inoperative the weights W will draw down their end of the beam B, thus raising the electrodes. The closing and opening of the key will also serve to start and stop the motor. When the battery is not required for use the electrodes are left clear of the fluid by removing or adjusting the stop S.

It is obvious that a spring may be used instead of the weights W, or the coil F' may be fixed horizontally on the beam, and the core, when attracted into the coil, may cause that end of the beam to preponderate, and so immerse the electrodes.

In order to obviate the necessity for adjusting the electrodes so that they shall be slightly immersed before starting work, they may be left normally clear from the surface of the fluid. Then a local constant cell, Z, such as the well-known Leclanché, which is in circuit with the coil and key, may by closing the key sufficiently excite the coil to attract the core and slightly immerse the electrodes. The local cell, by means of a switch, Y, upon the moving beam, is then cut out, and the main current completes the immersion of the electrodes, as before described.

The apparatus, as before described, would give to the motor the full strength of the current upon closing the key, as the electrodes would be fully immersed. If it were desired to vary the strength of the current by varying the depth of the immersion of the electrodes, it can be effected by modifying the arrangement, as follows: The coil F', instead of forming part of the main circuit, is located on a derived circuit, X, between the electrodes and the key. Upon the derived circuit and within reach of the operator is placed a variable resistance, W', consisting, say, of carbon disks V. Then, when the key is closed, the current flows through the main and derived circuits, dividing itself proportionately to their resistances, which are adjusted by the lever U, so that normally the current flowing through the coil is enough to partially immerse the electrodes. Then, if the carbon disks be pressed together by the lever or other suitable means, their resistance will be lessened and more current will traverse the coil and less through the main circuit. The magnetism of the coil will thus be stronger and immerse the electrodes more, and any degree of immersion could be obtained by varying the pressure on the carbon disks.

It is evident that other modifications may be made and many changes in construction devised without departing from the spirit of my invention. Hence I do not limit myself to the construction shown and described; but, Having fully described my invention, what I claim as new, and desire to secure by Letters Patent, is—

1. In a galvanic battery, the combination, with a weighted tilting beam supporting the electrodes, of a cell or cells, an electro-magnet, and a core, all arranged substantially as described, so that the electrodes are immersed in or withdrawn from the exciting-fluid by the current of the battery itself, as set forth.

2. In a galvanic battery, the combination, with the electrodes adapted to be immersed in or withdrawn from the exciting-fluid by means of the current formed by the battery itself, of a core and a magnetic coil placed in the circuit of the battery, said circuit being provided with a suitable circuit-breaker, substantially as set forth.

3. In a galvanic battery, the combination, with the suspended electrodes, of a magnetic coil placed in the circuit of the battery and adapted to act upon a core, thus immersing the electrodes, and a key or equivalent device by which the circuit is broken, the magnetic coil rendered inoperative, and the electrodes withdrawn from the exciting-fluid, substantially as set forth.

4. In a galvanic battery, the combination, with the suspended electrodes adapted to be immersed in the exciting-fluid by means of the current formed by the battery itself, of a core, a magnetic coil placed in the circuit of the battery, and means for compensating for the decrease in weight of the electrodes when immersed, substantially as set forth.

5. In a galvanic battery, the combination, with a standard supporting a pivoted weighted beam and a stop device, of a core and electrodes suspended from the beam, and a magnetic coil arranged in the circuit of the battery, adapted to act upon said core, and thus immerse the electrodes in the exciting-fluid, and a circuit-breaker by means of which the electrodes are raised, substantially as set forth.

6. In a galvanic battery, the combination, with the electrode and cell, of the standard, the weighted beam, and the adjustable stop, substantially as set forth.

7. In a galvanic battery, the combination, with the electrodes and cells, of the standard and its adjustable stop and the beam provided with a segment, to which the core is flexibly connected, substantially as set forth.

8. In a galvanic battery, the combination, with the electrodes and cells, of the standard, the adjustable stop, and the weighted beam provided with the upwardly-inclined end supporting the electrodes, substantially as set forth.

9. In a galvanic battery, the combination, with the main battery and its suspended electrodes, of the standard and weighted beam and a local constant cell, and a switch, substantially as set forth.

10. In a galvanic battery, the combination, with the cells and electrodes, of the standard and beam, and a variable resistance located on a derived circuit, substantially as and for the purpose set forth.

In testimony whereof I have signed this specification in the presence of two subscribing witnesses.

ARTHUR J. HOLT.

Witnesses:
T. F. CARROLL,
C. L. HARVEY.